United States Patent
Lee et al.

(10) Patent No.: US 8,302,052 B2
(45) Date of Patent: Oct. 30, 2012

(54) METHODS, SYSTEMS, AND COMPUTER PROGRAM PRODUCT FOR IMPLEMENTING HOTSPOT DETECTION, REPAIR, AND OPTIMIZATION OF AN ELECTRONIC CIRCUIT DESIGN

(75) Inventors: Brian Lee, Cambridge, MA (US); Srinivas Doddi, Fremont, CA (US); Ron Pyke, Bellevue, WA (US); Taber Smith, Saratoga, CA (US); Emmanuel Drege, Los Gatos, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 322 days.

(21) Appl. No.: 12/490,245

(22) Filed: Jun. 23, 2009

(65) Prior Publication Data
US 2010/0324878 A1   Dec. 23, 2010

(51) Int. Cl.
*G06F 9/455* (2006.01)
(52) U.S. Cl. .......... 716/112; 716/52; 716/106; 716/119; 703/14
(58) Field of Classification Search .................. 703/14; 716/106, 119, 52, 112
See application file for complete search history.

(56) References Cited

U.S. PATENT DOCUMENTS

| | | | |
|---|---|---|---|
| 6,298,470 B1 | 10/2001 | Breiner et al. | |
| 7,089,516 B2 | 8/2006 | Arora et al. | |
| 7,218,984 B1 | 5/2007 | Bayat et al. | |
| 7,694,244 B2 | 4/2010 | Chan et al. | |
| 7,792,595 B1 | 9/2010 | Bomholt et al. | |
| 2002/0055193 A1 | 5/2002 | Tsai | |
| 2008/0147374 A1 | 6/2008 | Chan et al. | |
| 2008/0148194 A1 | 6/2008 | Chan et al. | |
| 2008/0148195 A1 | 6/2008 | Chan et al. | |
| 2008/0148216 A1 | 6/2008 | Chan et al. | |
| 2008/0183442 A1 | 7/2008 | Loo et al. | |
| 2008/0235645 A1* | 9/2008 | Kahng et al. | 716/11 |
| 2009/0005894 A1* | 1/2009 | Bomholt et al. | 700/97 |
| 2009/0106714 A1 | 4/2009 | Culp et al. | |
| 2009/0228129 A1 | 9/2009 | Moyne et al. | |
| 2010/0083200 A1* | 4/2010 | Song et al. | 716/5 |
| 2010/0121474 A1 | 5/2010 | Bomholt et al. | |
| 2010/0324878 A1* | 12/2010 | Lee et al. | 703/14 |

OTHER PUBLICATIONS

Kohaal et al., "Litho(graphy) Aware Device Extraction and Impact on Timing/Power Models," 2007.

(Continued)

*Primary Examiner* — Vuthe Siek
*Assistant Examiner* — Mohammed Alam
(74) *Attorney, Agent, or Firm* — Vista IP Law Group, LLP

(57) ABSTRACT

Disclosed are a method, a system, and a computer program product for implementing hotspot detection, repair, and optimization of an electronic circuit design, which, in some embodiments, defines, identifies criteria for hotspots/metrics or optimization objective function; performs the initial hotspot or metric prediction; identifies correction candidate (s); applies a correction candidate to the electronic circuit design; and determines whether the outcome of applying the correction candidate is acceptable. The method or the system identifies custom correction candidate(s) or custom command(s) and identifies one or more hints for the predicted hotspots or metrics; provides a single architecture to use a first model for hotspot identification/correction and a second model for design check; and provides the capability to apply a correction for a hotspot or metric, evaluate the effectiveness of the correction on the fly, and revert any changes made to the electronic circuit design by the correction.

34 Claims, 9 Drawing Sheets

OTHER PUBLICATIONS

Rangarajan et al., "Modeling of 65nm & 45nm Manufacturing Effects in Cadence QRC Extractor & Impact on Timing Analysis," 2007.

Non-Final Office Action dated Oct. 13, 2010.

Non-Final Office Action dated Apr. 19, 2011.

Notice of Allowance dated Oct. 17, 2011.

Balasinki et al. "Using Fill Synthesis for Enhanced Planarization." EDA Design Line. Nov. 27, 2006.

Chiang et al. "Model-Based Metal Fill Optimized Planarization and Increases Yield." EDA DesignLine, Mar. 22, 2007.

Lee, Brian. "Chapter 4: Modeling of Chemical Mechanical Polishing for Shallow Trench Isolation." Ph.D Thesis. MIT Department of Electrical Engineering and Computer Science. May 2002.

Stine et al. "The Physical and Electrical Effects of Metal Fill Patterning Practices for Oxide Chemical Mechanical Polishing Processes." IEEE Trans on Computer Aided Design. vol. 45, No. 3. p. 665-679. Mar. 1998.

Kahng et al. "Filling Algorithms for Layout Density Control."IEEE Trans on Computer Aided Design. vol. 18, No. 4 p. 445-462. Apr. 1999.

Tian et al. "Dummy-Feature Placement for Chemical-Mechanical Polishing Uniformity in a Shallow-Trench Isolation Process." IEEE Trans. on Computer Aided Design. vol. 21 No. 1 p. 63-71. Jan. 2002.

Sukharev et al. "Design-Aware RIE Process Optimization for Via/Contact Pattern Transfer." 25th International VLSI Multilevel Interconnection Conference, Keynote Presentation. Oct. 2008.

* cited by examiner

METHODS, SYSTEMS, AND COMPUTER PROGRAM PRODUCT FOR IMPLEMENTING HOTSPOT DETECTION, REPAIR, AND OPTIMIZATION OF AN ELECTRONIC CIRCUIT DESIGN

CROSS-REFERENCE TO RELATED APPLICATION(S)

This Application is related to U.S. application Ser. No. 12/242,442 entitled "METHOD, SYSTEM, AND COMPUTER PROGRAM PRODUCT FOR IMPLEMENTING A COMPACT MANUFACTURING MODEL IN ELECTRONIC DESIGN AUTOMATION", which was filed on Sep. 30, 2008 and is hereby incorporated by reference in its entirety.

BACKGROUND

The invention relates to technology for designing and verifying an integrated circuit ("IC") or electronic circuit design.

A semiconductor integrated circuit (IC) or an electronic circuit has a large number of electronic components, such as transistors, logic gates, diodes, wires, etc., that are fabricated by forming layers of different materials and of different geometric shapes on various regions of a silicon wafer.

Many phases of physical design may be performed with computer aided design (CAD) tools or electronic design automation (EDA) systems. To design an electronic circuit, a designer first creates high level behavior descriptions of the electronic circuit device using a high-level hardware design language. An EDA system typically receives the high level behavior descriptions of the electronic circuit device and translates this high-level design language into netlists of various levels of abstraction using a computer synthesis process. A netlist describes interconnections of nodes and components on the chip and includes information on circuit primitives such as transistors and diodes, their sizes and interconnections, for example.

An electronic circuit designer may use a set of layout EDA application programs to create a physical electronic circuit design layout from a logical circuit design. The layout EDA application uses geometric shapes of different materials to create the various electrical components on an electronic circuit and to represent electronic circuit components as geometric objects with varying shapes and sizes. After an electronic circuit designer has created an initial electronic circuit layout, the electronic circuit designer then verifies and optimizes the electronic circuit layout using a set of EDA testing and analysis tools. Verification may include, for example, design rule checking to verify compliance with rules established for various electronic circuit parameters.

Typically, geometric information about the placement of the nodes and components onto the chip is determined by a placement process and a routing process. The placement process is a process for placing electronic components or circuit blocks on the chip and the routing process is the process for creating interconnections between the blocks and components according to the specified netlist.

After an electronic circuit designer has created an initial electronic circuit layout, the electronic circuit designer then tests and optimizes the electronic circuit layout using a set of EDA testing and analysis tools. Common testing and optimization steps include extraction, verification, and compaction. The steps of extraction and verification are performed to ensure that the electronic circuit layout will perform as desired. The test of extraction is the process of analyzing the geometric layout and material composition of an electronic circuit layout in order to "extract" the electrical characteristics of the designed electronic circuit layout. The step of verification uses the extracted electrical characteristics to analyze the circuit design using circuit analysis tools.

Common electrical characteristics that are extracted from an electronic circuit layout include capacitance and resistance of the various "nets" (electrical interconnects) in the electronic circuit. These electrical characteristics are sometimes referred to as "parasitic" since these electrical characteristics are not desired by the designer but result from the underlying physics of the electronic circuit design. For example, when an electronic circuit designer wishes to connect two different locations of an electronic circuit with an electrical conductor, the electrical circuit designer would ideally like a perfect conductor with zero resistance and zero capacitance. However, the geometry of a real conductor, its material composition, and its interaction with other nearby circuit elements will create some parasitic resistance and parasitic capacitance. The parasitic resistance and parasitic capacitance affect the operation of the designed electronic circuit. Thus, the effect of the parasitic resistance and parasitic capacitance on the electrical interconnect must be considered.

To test an electronic circuit layout, the electronic circuit designer 'extracts' parasitic resistance and parasitic capacitance from the electronic circuit layout using an extraction application program. Then, the electronic circuit designer analyzes and possibly simulates the electronic circuit using the extracted parasitic resistance and parasitic capacitance information. If the parasitic resistance or parasitic capacitance causes undesired operation of the electronic circuit, then the layout of the electronic circuit must be changed to correct the undesired operation. Furthermore, minimizing the amount of parasitic resistance and parasitic capacitance can optimize the performance of the electronic circuit by reducing power consumption or increasing the operating speed of the electronic circuit.

Based upon this geometric information, photomasks are created for lithographic manufacturing of the electronic product. A photomask, or more simply a "mask," provides the master image of one layer of a given integrated chip's physical geometries. A typical photolithography system projects UV light energy onto and through the mask in order to transmit the mask pattern in reduced size to the wafer surface, where it interacts with a photosensitive coating on the wafer.

An electronic circuit has a large number of electronic components, such as transistors, logic gates, diodes, wires, etc. that are fabricated by forming layers of different materials and of different geometric shapes on various regions of a silicon wafer. The design of an electronic circuit transforms a circuit description into a geometric description called a layout. The process of converting specifications of an electronic circuit into a layout is called the physical design. After the layout is complete, it is then checked to ensure that it meets the design requirements. The result is a set of design files, which are then converted into pattern generator files. The pattern generator files are used to produce patterns, or masks, by an optical or electron beam pattern generator. Subsequently, during fabrication of the electronic circuit, these masks are used to pattern chips on the silicon wafer using a sequence of photolithographic steps. Electronic components of the electronic circuit are therefore formed on the wafer in accordance with the patterns.

Copper interconnect has become the mainstream at 130 nm or beyond because of its advantages over aluminum, such as its lower resistivity and power consumption, and because it is less prone to electromigration. On the other hand, copper interconnect has also brought challenges to manufacturing of electronic circuits because of the effects resulting from the interaction between copper interconnects and the neighboring dielectric materials, especially in the chemical-mechanical polishing (CMP) process. A typical effect comprises thickness or topographical variation due to copper dishing and/or dielectric erosion.

The topographical variation presents an even more profound problem in multi-layer designs, because a topographical variation on a lower layer may be compounded by additional topographical variation(s) above the lower layer, leading to pooling, cracking, and other manufacturing or reliability issues. In order to compensate for the topographical variations, floating or dummy metal fills are typically added into electronic circuit designs to ensure that the electronic circuit designs meet the metal density requirement usually imposed by foundries. The dummy fill shapes have no impact on the behavior and timing of the circuit except for potentially some parasitic impact. Furthermore, there may exist multiple layers for a typical electronic circuit component. At the lower layers, there may exist small undulation or topographical variation caused by these process hotspots. In addition, the undulation on the lower layers may accumulate and compound on top of each other. Therefore, the electronic circuit component may end up with problems such as copper pooling which may lead to shorts between conductors and thus result in significant yield loss.

With the continual effort to shrink the feature size of electronic circuit designs, various model-based, as opposed to rule-based, approaches have been proposed to minimize or better control the thickness variations. A typical rule-based approach essentially applies dummy fill rules under certain circumstances that trigger the application of the dummy fill rules to an electronic circuit design. Some of these dummy fill rules may comprise one or more dummy fill shapes which may be added to the electronic circuit design upon the application of the corresponding dummy fill rules to the electronic circuit design. For example, a rule-based dummy fill approach may comprise a dummy fill rule which requires "maintaining metal density at X percent of the area of interest". When this rule-based approach is used on an electronic circuit design, the metal density of a portion or even a layer of the electronic design is examined. Where it is determined that the metal density falls below the threshold requirement, the rule-based approach adds one or more dummy fill shapes or even intelligent dummy fill shapes to the portion to maintain the metal density while hoping to address the thickness or topographical variation issues in the electronic circuit design.

On the other hand, a model-based approach takes into account the topographic profiles of the copper layer including the copper layer by electrochemical plating and copper seed layer by a deposition process, and a barrier layer such as a tantalum or a tantalum-nitride layer. Some model-based approaches may even take one or more of the underlying layers into account to evaluate the cumulative effects of a multi-layer electronic circuit design. These model-based approaches yield a more accurate prediction or estimate of the topography and other attributes of the electronic circuit design, which may then be used to guide more accurate methods to fix any critical thickness variations. Since model-based approaches almost always involve intensive computation in simulation, they are usually used during the later stages of the electronic circuit design such as the sign-off/design closure stage.

At and beyond the 65 nm semiconductor manufacturing process node, accurate modeling of systematic and/or random variations in, for example, design layer thickness, which may be caused by various manufacturing processes, such as dry or wet etching, chemical mechanical polishing (CMP), and lithography, may be crucial for achieving higher chip performance, yield, and/or faster time to volume production. In addition, especially in light of the continual shrinking of geometries in the electronic circuit designs, there may exist certain proprietary manufacturing processes or design recipes which may be individually or jointly developed by foundries and "fab-less" design houses in order to ensure the electronic circuit design meets the performance, manufacturing, and or cost metrics. These proprietary manufacturing processes or design recipes further complicate the accuracy of these models.

Traditional design-process interface based on design rules may not capture new design-dependent manufacturing problems that may be introduced with smaller geometries or more complex process stacks. In some cases, electronic circuit designs which pass design rule checks (DRC) may still pose more problems when it comes to manufacturing the electronic circuits according to these electronic circuit designs due to, for example, subsequent processes, such as the chemical mechanical polishing, etching, or resolution enhancement techniques. Such problems or issues may make an electronic circuit or part thereof impossible or difficult to manufacture, reduce the yield, or fail to meet certain performance or cost requirements.

Recent development has introduced physics based modeling to predict or estimate full chip topographic variations caused by CMP processes. Certain electronic design automation (EDA) tools provide the capability of checking for manufacturing intent by using the more accurate physics based models to identify any DRC-like violations such as copper pooling or large step heights between the copper film and the dielectric film. Such problems as copper pooling or excessive thickness or topographic variation may result in short or open circuits within the electronic circuit or may negatively impact timing closure and thus produce detrimental effects on chip yield. For most, if not all of these EDA tools, the hotspot checking is generally provided by the foundries and is sometimes enhanced with certain company- or design-specific checks. These EDA tools then use either model based or rule based metal fill together with other techniques such as wire spreading or wire splitting to at least attempt to address these problems in post-route optimization.

In some electronic circuit manufacturing processes such as chemical mechanical polishing, rule-based or model-based metal fill has been rendered even more difficult due at least in part to long-range effects—other components of the electronic circuit located a few microns or even farther away may negatively affect the topography of any given region.

Nonetheless, recent approaches in hotspot detection and fixing either perform intensive simulation (such as optical simulation based on the Hopkins' formula) or are based on some heuristics or some design rules provided by other rule-based or model-based design checking EDA tools or some other entities (such as the foundries). These approaches are either computation intensive and are thus inherently slow, or are inaccurate due to the nature of the design rules, guidelines, or heuristics. Moreover, some of these recent approaches distinguish between the pre-optical proximity correction (OPC) and post-OPC in terms of hotspot detection and fixing. Some approaches even require the performance of OPC simulation to the pre-OPC layouts, while some other approaches find the correlation and similarity between the pre-OPC and post-OPC stages in terms of the OPC and apply the same simulation for both the pre-OPC and post-OPC hotspot detection and fixing.

For modern electronic circuit designs, it is well known that it is very difficult, if not entirely impossible, to fix all the printability issues with resolution enhancement techniques (RETs) during OPC. These printability issues which the RETs fail to correct during the OPC stage are referred to as lithography hotspots. Similarly, as a result of a manufacturing process, any regions in the electronic circuit design which may not be reliably corrected with existing methods or subsequent manufacturing processes may be referred to as process hotspots. For example, certain film thickness or topographic variation that exceeds certain threshold numbers may be referred to as a CMP hotspot.

It is not uncommon for an electronic circuit design to have problems such as copper pooling on higher layers causing significant yield loss due to the failure to detect and repair various process hotspots on lower layers. This may be the case even if each layer of the electronic circuit design is DRC clean, and metal fill has already been performed for each layer.

Therefore, there exists a need for a method, system, and computer program product for implementing hotspot detection, repair, and optimization of an electronic circuit design which effectively and efficiently resolve the above concerns for all stages of the electronic circuit designs, including the early stages of the electronic circuit design such as floor planning, place and route, and post route optimization.

SUMMARY

Disclosed are various embodiments of methods, systems, and computer program products for implementing hotspot detection, repair, and optimization of an electronic circuit design for all stages of the electronic circuit designs including the early stages of the electronic circuit design such as floor planning, place and route, and post route optimization.

Various embodiments of the method or the system for implementing hotspot detection, repair, and optimization of an electronic circuit design comprise the acts or modules of defining or identifying one or more hotspot criteria. For purpose of ease of illustration and explanation, in certain aspects, a hotspot or a process hotspot represents an area or a region in an electronic circuit design where the properties of a film or a feature in the area or the region does not fall within the design specification or may not be reliably fixed or mitigated by subsequent fabrication process(es), and as a result of such properties of the film or the feature, there may exist some issues or problems such as manufacturing-related, yield-related, performance-related, or cost-related issues or problems.

In certain other aspects, a hotspot or a process hotspot represents an area or a region in an electronic circuit design in which improvements may be necessary or desired in order to enhance, refine, or perfect various aspects, such as the manufacturing, performance, yield, or cost aspect, of the electronic circuit design. In these embodiments, the method or the system for implementing hotspot detection, repair, and optimization of an electronic circuit design further comprises a process or a module for performing the initial hotspot and metrics prediction; a process or a module for identifying, determining, or exploring one or more correction candidates which may be used to eliminate or reduce the number of hotspots; a process or module for verifying whether the hotspots from the prediction process or module constitute true hotspots or whether the predicted metrics actually are sufficiently accurate. In some embodiments, the method or the system for implementing hotspot detection, repair, and optimization of an electronic circuit design further optionally comprises a process or a module of updating or creating one or more database tables in a database system to store various input and output of the above modules or processes.

BRIEF DESCRIPTION OF THE FIGURES

The drawings illustrate the design and utility of preferred embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are directed to a method, system, and computer program product for implementing hotspot detection, repair, and optimization of an electronic circuit design in the single embodiment or in some embodiments. Other objects, features, and advantages of the invention are described in the detailed description, figures, and claims.

The present invention will now be described in detail with reference to the drawings, which are provided as illustrative examples of the invention so as to enable those skilled in the art to practice the invention. Notably, the figures and the examples below are not meant to limit the scope of the present invention. Where certain elements of the present invention can be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, the present invention encompasses present and future known equivalents to the components referred to herein by way of illustration.

Figure 1:
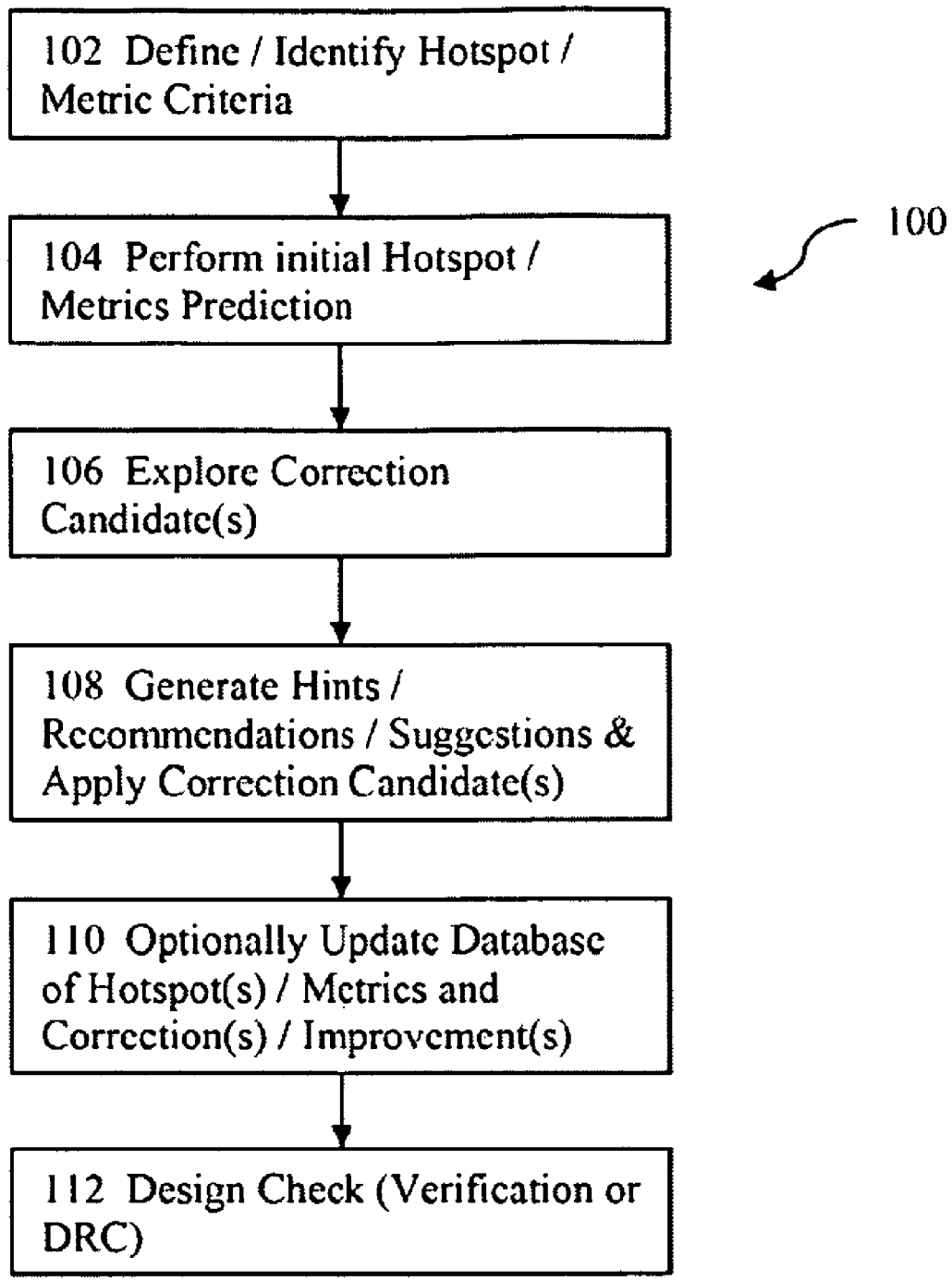
FIG. 1 illustrates the top level diagram of a process or hardware module for implementing hotspot detection, repair, and optimization of an electronic circuit design.

FIG. 1 illustrates the top level diagram of a process or hardware module 100 for implementing hotspot detection, repair, and optimization of an electronic circuit design during various stages of the design of an electronic circuit design in various embodiments. At 102, the method or system for implementing hotspot detection, repair, and optimization of an electronic circuit design during various stages of the design of an electronic circuit design comprises an act or a module for defining, identifying, or determining one or more criteria for hotspots or metrics. In the single embodiment or in some embodiments, the one or more criteria for hotspots or metrics may be custom defined by the user, such as an electronic circuit designer, and supplied to the process or module via various input means that are well known in the art.

In the single embodiment or in some embodiments the custom defined criterion may be supplied by the user in the form of one or more scripts, one or more coded and/or compiled routines in software, hardware, or combination thereof. One advantage of using a script for the custom criteria is that the user may implement and customize the definition or criterion (criteria) of any hotspots or metrics arising out of the user's unique design or manufacturing requirements without waiting for the electronic design automation (EDA) tool vendor(s) to supply the integrated module to accommodate such unique requirements and without worrying about the disclosure of such unique design or manufacturing requirements and associated intellectual property issues to the EDA tool vendor(s). Another advantage of the capability of the process or module for implementing hotspot detection, repair, and optimization of an electronic circuit design during various stages of the design of an electronic circuit design to receive such criterion (criteria) in the form of a script language is the ease of implementation. A simple example of a hotspot definition may comprise "copper film thickness is more than 200 Angstroms above the average copper film thickness of a given metal layer."

In the single embodiment or in some embodiments, the metrics may comprise, for example, the yield metric, cost metric, density metric, sensitivity to process variation metric, or chip performance metrics such as timing metrics. In the single embodiment or in some embodiments, the method or the hardware system for implementing hotspot detection, repair, and optimization of an electronic circuit design during various stages of the design of an electronic circuit design defines, identifies, or determines at least one of the one or more criteria based on the output of various models or design situations, constraints, or rules. In the single embodiment or in some embodiments, various hotspot or metric criteria may be combined by various means such as a linear weighted combination or a non-linear combination of two or more criteria to aid the definition, identification, or determination of the one or more hotspot or metric criteria. In the single embodiment or in some embodiments, the one or more criteria for the hotspots or the metrics may be used to create one or more objective functions for purposes such as design optimization.

At 104, the method or the hardware system for implementing hotspot detection, repair, and optimization of an electronic circuit design during various stages of the design of an electronic circuit design further comprise the act or the module for performing the initial hotspot or metric prediction in the single embodiment or in some embodiments. In the single embodiment or in some embodiments, the method or the hardware system may perform the act of performing the initial hotspot or metric prediction by using a single model or a plurality of models. In the single embodiment or in some embodiments, any model or models may be used for performing such prediction. In the single embodiment or in some embodiments, the method or the hardware system may graphically present the initial hotspot or metric prediction results on a computer display apparatus to the user and/or may store or may persist the initial hotspot or metric prediction results on a computer readable storage medium.

For example, the method or the hardware system may use one or more simple yet efficient models (e.g., a rule-based model, a look-up table, a core network approach, a polynomial fitting model, or an empirical model, etc.), one or more highly accurate physics-based models (e.g., an optical simulation based on the Hopkins' formula), or combination thereof for performing such prediction.

For instance, the single, integrated architecture of the method or the hardware system for implementing hotspot detection, repair, and optimization of an electronic circuit design during various stages of the design of an electronic circuit design may run the electronic circuit design of interest through one or more efficient rule-based models to perform the prediction of hotspots or metrics in some embodiments.

As another example, the method or the hardware system for implementing hotspot detection, repair, and optimization of an electronic circuit design during various stages of the design of an electronic circuit design may perform thorough and extensive simulation of the electronic circuit design by using one or more highly accurate physics-based models in order to perform prediction based on the results of the simulation in some other embodiments.

As another example, the method or the system may run the electronic circuit design by using a combination of one or more highly efficient models and one or more highly accurate physics-based models. For example, the method or the system may invoke the one or more highly efficient models for areas or regions of the electronic circuit where performance, design, or manufacturing requirements are not critical and the one or more physics-based models for areas or regions where performance, design, or manufacturing requirements are more critical. In the single embodiment or in some embodiments, the method or the hardware system for implementing hotspot detection, repair, and optimization of an electronic circuit design during various stages of the design of an electronic circuit design may perform the initial hotspot/metric prediction without performing any simulation.

In the single embodiment or in some embodiments, the model may comprise or may be built upon a model for a manufacturing process or technique such as a deposition process, a removal process, a patterning process, a property modification process, or an image processing process, each of which will be described in greater details in the following paragraphs.

DEPOSITION AND REMOVAL PROCESSES OR TECHNIQUES: The deposition process or technique may comprise, for example, but shall not be limited to, physical vapor deposition (PVD), chemical vapor deposition (CVD), atomic layer deposition (ALD), electrochemical deposition or electro-plating (ECD), electroless plating or deposition, auto-catalytic plating or deposition, and molecular beam epitaxy (MBE). The removal processes may comprise, for example but shall not be limited to, isotropic or anisotropic wet or dry etching, chemical mechanical polishing (CMP), or reflow processes.

PATTERNING PROCESSES OR TECHNIQUES: The patterning process may comprise, for example, but shall not be limited to, lithography processes or techniques such as microlithography, nanolithography, photolithography, electron beam lithography, maskless lithography, nanoimprint lithography, interference lithography, x-ray lithography, extreme ultraviolet lithography, or scanning probe lithography, or the plasma asking processes.

IMAGING PROCESSES OR TECHNIQUES: The imaging processing techniques or processes may comprise, for example, but shall not be limited to, various resolution enhancement techniques such as ruled-based or model-based Optical Proximity Correction (OPC), Sub-resolution Assist Features (SRAF), Phase Shifting-Mask (PSM), or Off-Axis Illumination (OAI).

PROPERTY MODIFICATION PROCESSES OR TECHNIQUES: The property modification processes or techniques may comprise, for example, but shall not be limited to, ion implantation, annealing, oxidation, or UVP (ultraviolet light processing).

In the single embodiment or in some embodiments, the method or the hardware system for implementing hotspot detection, repair, and optimization of an electronic circuit during various stages of the design of an electronic circuit design comprises a single architecture, environment, or framework (collectively architecture hereinafter) which provides, for the users, access to both the one or more efficient models and the one or more physics-based models. One of the advantages of providing such a single architecture for accessing both types of models is that the method, the hardware system, or even the user may have a choice of models based on various requirements or needs. For example, the method, the hardware system, or the user may opt for using one or more efficient models to perform quick design optimization (s) while using the one or more physics-based models to determine when or whether further optimization is necessary or desired.

At 106, the method or the hardware system for implementing hotspot detection, repair, and optimization of an electronic circuit design during various stages of the design of an electronic circuit design optionally provides an opportunity for the user to explore one or more correction candidates based on the predicted hotspots or metrics in the single embodiment or in some embodiments. In these embodiments, the method or the system may further estimate whether the predicted hotspots may be eliminated or fixed or whether the predicted metrics may be improved by applying at least one of the correction candidates to the electronic circuit design.

The method or the hardware system may further generate a corresponding set of commands which may be used by the method or the system to take appropriate actions to apply a particular correction candidate to the electronic circuit design. In addition or in the alternative, the method or the hardware system for implementing hotspot detection, repair, and optimization of an electronic circuit design during various stages of the design of an electronic circuit design may also evaluate a particular correction candidate's ability to correct one or more hotspots or to improve one or more metrics. For example, a command may comprise a series of instructions to add metal fill according to some density rules or to perform wire splitting in some regions of the electronic circuit design in some embodiments.

At 108, the method or the hardware system for implementing hotspot detection, repair, and optimization of an electronic circuit design during various stages of the design of an electronic circuit design generate one or more hints, recommendations, or suggestions (collectively hints hereinafter) in the single embodiment or in some embodiments. In the single embodiment or in some embodiments, the various hints, recommendations, or suggestions may be ranked depending upon some criteria. The criteria may comprise, for example, absolute or relative likelihood of success in fixing a hotspot or in improving a metric, ease of implementation of the corresponding correction candidate (e.g., a dummy metal fill is considered to be easier to implement than wire splitting or wire spreading). In the single embodiment or in some embodiments, these hints may be arranged or persisted in an ordered list or a hierarchical structure such as a B–tree, B+tree, or other types of data structure according to their respective ranks.

In the single embodiment or in some embodiments the method or the hardware system for implementing hotspot detection, repair, and optimization of an electronic circuit during various stages of the design of an electronic circuit design further allows the input of custom correction candidates from external sources, such as the electronic circuit designer. For example, the user may customarily craft a correction candidate to fit a performance, design, or manufacturing requirement that is unique to the user or the user's company. For instance, the electronic circuit design may exhibit a particular type of hotspot or a particular metric that is unique to the user's design or manufacturing process, or the user may have unique, confidential, or proprietary ways of correcting hotspots or improving metrics. Similar to that of the, custom hotspot/metric criterion, the customarily defined correction candidate may be supplied by the external source in the form of one or more scripts, one or more coded and/or compiled routines in software, hardware, or combination thereof.

In the single embodiment or in some embodiments, the method or the hardware system for implementing hotspot detection, repair, and optimization of an electronic circuit design during various stages of the design of the electronic circuit design may generate, identify, or determine the hints intelligently based on various criteria. For example, the method or the system may generate these hints based on prior knowledge or experience, or statistical analysis results. In the single embodiment or in some embodiments, the method or the system may generate these hints based on the ranked correction candidates or the evaluation results of the correction candidates. The method or the system may then generate or recommend commands to be used for the hints.

In the single embodiment or in some embodiments, the method or the hardware system for implementing hotspot detection, repair, and optimization of an electronic circuit design during various stages of the design of the electronic circuit design may then apply at least one of the correction candidates to the electronic circuit design based on the hints to fix one or more hotspots or to improve one or more metrics. In the single embodiment or in some embodiments, the method or the system may further take the user's input in determining which correction candidate(s) to apply. In addition or alternatively, the method or the hardware system for implementing hotspot detection, repair, and optimization of an electronic circuit design during various stages of the design of an electronic circuit design may apply one or more custom correction candidates to the electronic circuit design.

In the single embodiment or in some embodiments, the method or the hardware system for implementing hotspot detection, repair, and optimization of an electronic circuit design during various stages of the design of an electronic circuit design provide a single architecture which provides the capability of applying one or more correction candidates to make temporary modifications or fixes to the electronic circuit design and determine whether the temporary modifications or fixes are desirable by running, for example, both the layout editing tools and optimization tools within the single architecture. One of the advantages of applying one or more correction candidates to make temporary modifications or fixes to the electronic circuit design is that the modifications or fixes to the electronic circuit design may be applied immediately so the designer may review whether the outcome of such modifications or fixes is desirable and may undo the modifications or fixes to restore the electronic circuit design to a previously known good state or the state prior to the application of the modifications or fixes.

At 110, in the single embodiment or in some embodiments, the method or the hardware system for implementing hotspot detection, repair, and optimization of an electronic circuit design during various stages of the design of an electronic circuit design may further optionally create or update one or more database tables in a database system for storing or persisting the information for the hotspots, metrics, correction candidates, improvements, etc. More information about this perspective of some embodiments of the invention will be described in greater details in subsequent paragraphs of this Application. In the single embodiment or in some embodiments, the method or the hardware system for implementing hotspot detection, repair, and optimization of an electronic circuit design during various stages of the design of an electronic circuit design further optionally provides capability to create or update a mapping between the hotspots/metrics and their corresponding correction candidates and/or commands.

In the single embodiment or in some embodiments, the mapping may comprise a link, a pointer, a separate symbol data structure, a relation, or other data structures serving similar purposes between, for example, the hotspot and the corresponding correction candidate(s) and/or command(s). For example, the one or more database tables may comprise various rows of data which correlate the hotspots/metrics and the corresponding correction candidates and sequences of commands in some embodiments. The one or more database tables may comprise certain data such as the hotspots/metrics with a link to one or more separate symbol data structures which comprise other data such as the corrections and/or the sequences of commands.

At 112, the method or the hardware system for implementing hotspot detection, repair, and optimization of an electronic circuit during various stages of the design of an electronic circuit design may perform one or more design checks to determine, for example, whether there remain some hotspots, whether the metrics are acceptable or desired in the single embodiment or in some embodiments. In the single embodiment or in some embodiments, the method or the system may also determine whether further optimization or repair is required or desired.

In some embodiments where the method or the hardware system determines that there still remain some hotspots in the electronic circuit design after the method or the system has determined that no further optimization or repair is to be performed, the method or the system may further identify additional corrections not previously considered or evaluated and determine whether or not to apply these additional corrections to fix these remaining hotspots or to improve these metrics for the electronic circuit design. For example, the method or the system, after determining that no further optimization or correction is to be performed, may further identify or determine additional corrections such as wire splitting, wire spreading, or partial rip-up-and-reroute and apply these additional corrections to a portion of the electronic circuit design in some embodiments.

In addition or in the alternative, the method or the hardware system for implementing hotspot detection, repair, and optimization of an electronic circuit during various stages of the design of an electronic circuit design may also take additional hotspot/metric criteria which have not been previously considered by the method or the system and to further identify or determine additional correction candidate(s) corresponding to these criteria. In these embodiments, the method or the hardware system may then go through the process illustrated in FIG. 1 to implement hotspot detection, repair, and optimization of an electronic circuit design during various stages of the design of an electronic circuit design.

In various embodiments, the method or the hardware system for implementing hotspot detection, repair, and optimization of an electronic circuit design during various stages of the design of an electronic circuit design set forth herein may be applied to various stages of the design including, for example, floorplanning, place and route, post-route optimization, pre-OPC, or post-OPC design stage. That is, various embodiments provide not only the capability of construct-by-correction but also the capability of correct-by-construction to an electronic circuit design.

In the single embodiment or in some embodiments, the method or the system may be used on either a pre-OPC or a post-OPC layout because the method or the system in these embodiments may be applied to early stages of the electronic circuit design process. Moreover, the method or the system provides a single computing architecture, environment, or framework which provides access to both physics-based models as well as efficient models. That is, these embodiments provide a single environment and architecture which enables the use of any design modification command to correct problems on the fly and allow more complex interactions of design rules and multiple models and do not limit to either a high-quality, more accurate model or an efficient but less accurate model while taking at least the long-range effect into account. The method or the hardware system may also perform various acts as set forth herein without performing any physics-based simulation.

In the single embodiment or in some embodiments, the method or the system is design rules or design constraints aware while performing various actions as described in the preceding or subsequent sections. In these embodiments, the method or the system may automatically reject the implementation of a change to the electronic circuit design if the method or the system determines that the implementation of such a change may violate a design rule or a design constraint. In other words, the method or the system may be considered as DRC clean in the single embodiment or in some embodiments.

Figure 2:
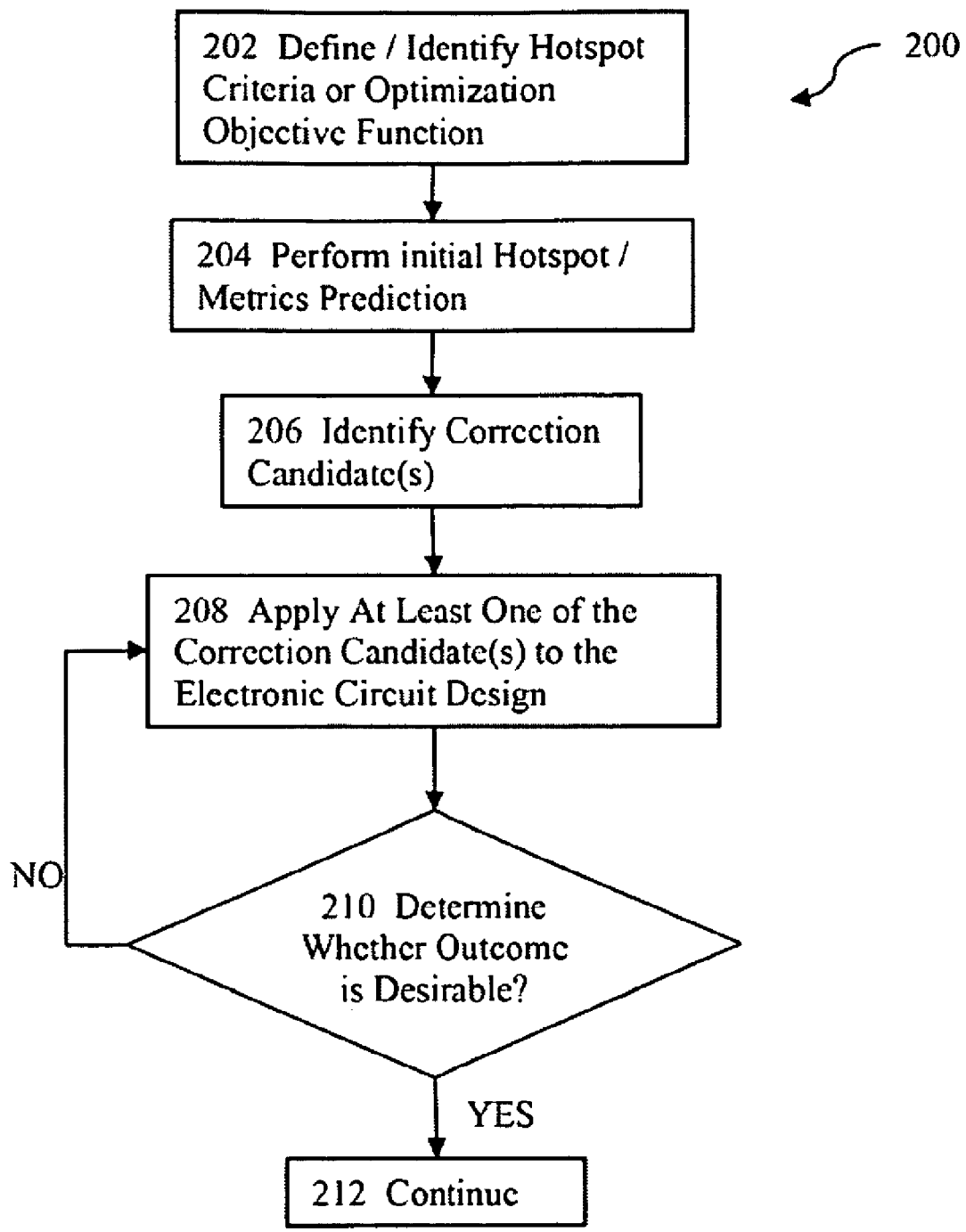
FIG. 2 illustrates the top level diagram of the method or the hardware system for implementing hotspot detection, repair, and optimization of an electronic circuit design in a single embodiment or in some embodiments.

Referring to FIG. 2 which illustrates the top level diagram of the method or the hardware system 200 for implementing hotspot detection, repair, and optimization of an electronic circuit design in a single embodiment or in some embodiments. At 202, the method or the hardware system for implementing hotspot detection, repair, and optimization of an electronic circuit design during various stages of the design of an electronic circuit design defines, identifies, or determines one or more criteria for hotspots or metrics or one or more optimization objective functions in the single embodiments or in some embodiments. In the single embodiment or in some embodiments, the one or more criteria for hotspots or metrics may be custom defined by the user, such as an electronic circuit designer, and supplied to the process or module via various input means that are well known in the art. In the single embodiment or in some embodiments, the custom defined criterion may be supplied by the user in the form of one or more scripts, one or more coded and/or compiled routines in software, hardware, or combination thereof.

At 204, the method or the hardware system for implementing hotspot detection, repair, and optimization of an electronic circuit during various stages of the design of an electronic circuit design performs the initial prediction for hotspots or metrics in the single embodiment or in some embodiments. In the single embodiment or in some embodiments, the method or the hardware system may perform the initial hotspot or metric prediction by using a single model or a plurality of models. In the single embodiment or in some embodiments, any models may be used for performing such a prediction.

In the single embodiment or in some embodiments, the method or the hardware system may graphically present the initial hotspot or metric prediction results on a computer display apparatus to the user or may store or may persist the initial hotspot or metric prediction results on a computer readable storage medium. In the single embodiment or in some embodiments, the model may comprise or may be built upon a model for a manufacturing process or technique such as a deposition process, a removal process, a patterning process, a property modification process, or an image processing process. In the single embodiment or in some embodiments, the method or the hardware system for implementing hotspot detection, repair, and optimization of an electronic circuit design during various stages of the design of an electronic circuit design comprises a single architecture, environment, or framework (collectively architecture hereinafter) which provides, for the users, access to both the one or more efficient models and the one or more physics-based models.

At 206, the method or the hardware system for implementing hotspot detection, repair, and optimization of an electronic circuit design during various stages of the design of an electronic circuit design optionally provides an opportunity for the user to explore one or more correction candidates based on the predicted hotspots or metrics in the single embodiment or in some embodiments. In these embodiments, the method or the system may further estimate whether the predicted hotspots may be eliminated or fixed or whether the predicted metrics may be improved by at least some of the correction candidates individually or in combination.

The method or the hardware system may further generate a corresponding set of commands which may be used by the method or the system to take appropriate actions to apply a particular correction candidate to the electronic circuit design. In addition or in the alternative, the method or the hardware system for implementing hotspot detection, repair, and optimization of an electronic circuit design during various stages of the design of an electronic circuit design may also evaluate a particular correction candidate's ability to correct one or more hotspots or to improve one or more metrics. In the single embodiment or in some embodiments, the method or the hardware system may further rank the correction candidates based on some criteria. The criteria may comprise, for example, the likelihood of success in fixing a hotspot or in improving a metric or the ease of implementing the particular correction candidate.

At 208, the method or the hardware system for implementing hotspot detection, repair, and optimization of an electronic circuit during various stages of the design of an electronic circuit design applies at least one of the correction candidates to the electronic circuit design by identifying or determining a sequence of commands corresponding to the correction candidate to the electronic circuit design in the single embodiment or in some embodiments.

At 210, the method or the hardware system for implementing hotspot detection, repair, and optimization of an electronic circuit design during various stages of the design of an electronic circuit design determines whether the outcome of applying at least one of the correction candidates to the electronic circuit design is acceptable or desirable according to, for example, the specification of the electronic circuit design. In addition or in the alternative, the method or the system may determine whether the outcome is acceptable or desirable by determining whether additional optimization or modification is necessary in the single embodiment or in some embodiments.

Where the method or the system determines at 210 that the outcome of the application of at least one of the correction candidates is desirable or acceptable, the method or the hardware system proceeds to 212 to continue with the electronic circuit design process. Where the method or the system determines at 210 that the outcome of the application of at least one of the correction candidates is not desirable or acceptable, the method or the hardware system may loop back to 208 to apply further correction candidate(s) to the electronic circuit design in some embodiments. In the alternative or in addition, the method or the hardware system may also loop back to 202 to further define, identify, or determine one or more additional hotspot/metric criteria and proceeds through the method as described above.

Figure 3:
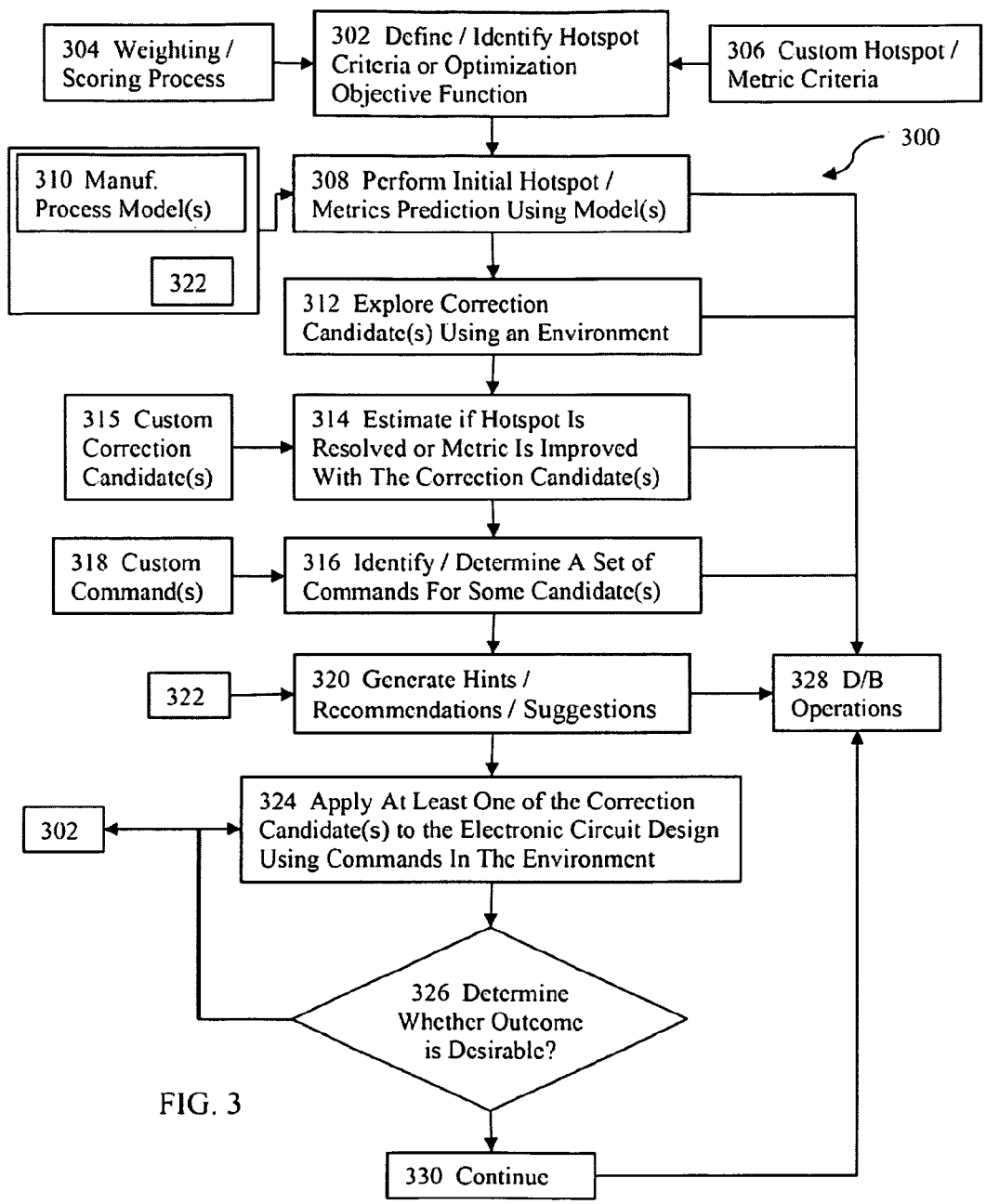
FIG. 3 illustrates further details of the process or the system for implementing hotspot detection, repair, and optimization of an electronic circuit design in the single embodiment or in some embodiments.

Referring to FIG. 3 which illustrates further details of the process or the hardware system 300 for implementing hotspot detection, repair, and optimization of an electronic circuit design an electronic circuit design in the single embodiment or in some embodiments. At 302, the method or system for implementing hotspot detection, repair, and optimization of an electronic circuit design during various stages of the design of an electronic circuit design comprises an act or a module for defining, identifying, or determining one or more criteria for hotspots or metrics. In the single embodiment or in some embodiments, the one or more criteria for hotspots or metrics may be custom defined by the user, 306, such as an electronic circuit designer, and supplied to the process or module via various input means that are well known in the art and will thus not be reproduced here.

In the single embodiment or in some embodiments, the custom defined criterion may be supplied by the user in the form of one or more scripts, one or more coded and/or compiled routines in software, hardware, or combination thereof. One advantage of using a script for the custom criteria is that the user may implement and customize the definition or criterion (criteria) of any hotspots or metrics arising out of the user's unique design or manufacturing requirements without waiting for the electronic design automation (EDA) tool vendor(s) to supply the integrated module to accommodate such unique requirements and without worrying about the disclosure of such unique design or manufacturing requirements and associated intellectual property issues to the EDA tool vendor(s). Another advantage of the capability of the process or module for implementing hotspot detection, repair, and optimization of an electronic circuit design during various stages of the design of an electronic circuit design to receive such criterion (criteria) in the form of script language is the ease of implementation.

In the single embodiment or in some embodiments, the method or system for implementing hotspot detection, repair, and optimization of an electronic circuit design during various stages of the design of an electronic circuit design may further comprise a weighting or a scoring process or module which may be invoked to identify or define one or more optimization objective functions by combining a plurality of the criteria by various means such as a linear weighted combination or a non-linear combination of two or more criteria to aid the definition, identification, or determination of the one or more optimization objective functions. The one or more optimization objective functions may be used, for example, in the overall design optimization.

At 308, the method or the system for implementing hotspot detection, repair, and optimization of an electronic circuit design further comprises a process or a module for performing the initial hotspot and metrics prediction by using one or more models in the single embodiment or in some embodiments. In the single embodiment or in some embodiments, any models including one or more efficient models, one or more physics-based models, or the combination thereof may be used for performing such an initial prediction. For example, the method or the hardware system may use one or more simple yet efficient models (e.g., a rule-based model, a look-up table, a core network approach, a polynomial fitting model, or an empirical model, etc.), one or more highly accurate physics-based models (e.g., an optical simulation based on the Hopkins' formula), or combination thereof for performing such prediction.

In the single embodiment or in some embodiments, the method or the hardware system for implementing hotspot detection, repair, and optimization of an electronic circuit design during various stages of the design of an electronic circuit design may identify, receive, or determine these models which may further comprise or may be built upon a model for a manufacturing process or technique, 310, such as a deposition process, a removal process, a patterning process, a property modification process, or an image processing process.

At 312, the method or the hardware system for implementing hotspot detection, repair, and optimization of an electronic circuit during various stages of the design of an electronic circuit design optionally provides an opportunity for the user to explore one or more correction candidates based on the predicted hotspots or metrics in the single embodiment or in some embodiments. At 314, the method or the system may further estimate whether the predicted hotspots may be eliminated or fixed or whether the predicted metrics may be improved by applying at least some of the correction candidates individually or in combination to the electronic circuit design in the single embodiments or in some embodiments. At 315, the method or the hardware system for implementing hotspot detection, repair, and optimization of an electronic circuit design during various stages of the design of an electronic circuit design may identify or receive one or more custom correction candidates from external sources such as from an electronic circuit designer.

At 316 in the single embodiment or in some embodiments, the method or the hardware system may further identify, determine, or generate a corresponding set or sequence of commands which may be used by the method or the hardware system to take appropriate actions to apply a particular correction candidate to the electronic circuit design. In the single embodiment or in some embodiments, the method or the hardware system may, at 318, identify or receive custom commands from external sources such as an electronic circuit designer in the single embodiment or in some embodiments.

One of the advantages of providing the capability of identifying or receiving custom correction candidates or custom commands is that the user or the electronic circuit designer need not worry about disclosure of certain unique, confidential, or proprietary ways of addressing particular issues or of improving particular metrics of a particular electronic circuit design to the EDA tool vendors. In the single embodiment or in some embodiments, at least one of the custom correction candidates or the custom commands may be supplied by the external sources in the form of one or more scripts, one or more coded and/or compiled routines in software, hardware, or combination thereof. One of the advantages of providing the capability of receiving or identifying the custom correction candidate(s) or custom command(s) in the form of one or more scripts is that the users may quickly generate the desired custom correction candidates or custom commands without waiting for the EDA tool vendor to update the compiled code in order to accommodate the custom correction candidate(s) or custom commands in order to enhance time to market or time to volume production.

At 320, the method or system for implementing hotspot detection, repair, and optimization of an electronic circuit design during various stages of the design of an electronic circuit design may generate, determine, or identify one or more hints in the single embodiment or in some embodiments. In some embodiments, the method or the system may identify, generate, or determine the one or more hints based on one or more criteria which may comprise, for example, prior knowledge of or experience with other electronic circuit designs or parts thereof, or certain statistical analysis results correlating electronic circuit design hotspots/metrics and correction candidates and/or commands.

Figure 7:
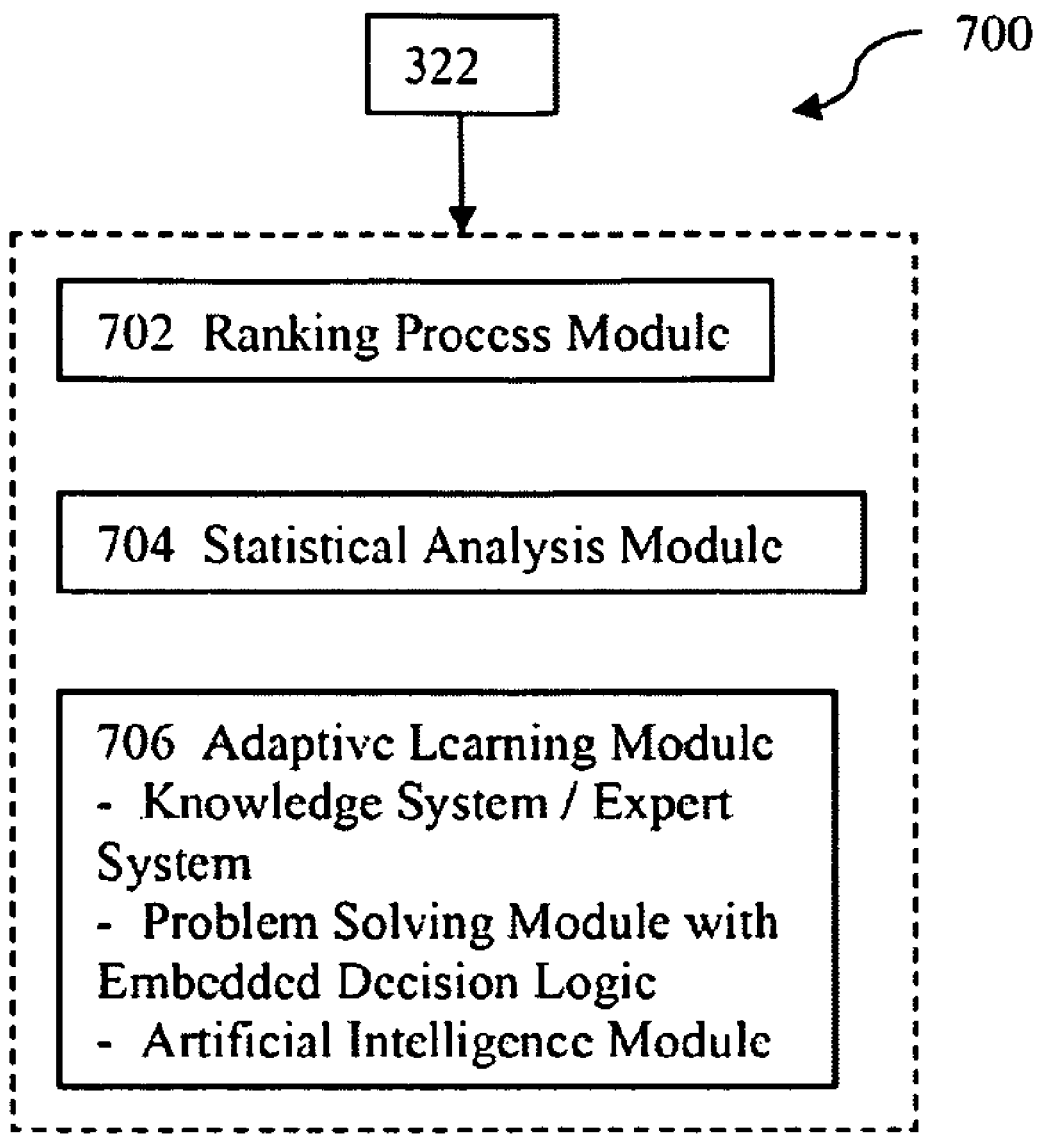
FIG. 7 illustrates some details of some optional process(es) or module(s) of the method or the system for implementing hotspot detection, repair, and optimization of an electronic circuit design as depicted in FIG. 3 in the single embodiment or in some embodiments.

Referring to FIG. 7 which illustrates some details of some optional process(es) or module(s), 700, of the method or the system for implementing hotspot detection, repair, and optimization of an electronic circuit design as depicted in FIG. 3 in the single embodiment or in some embodiments. In the single embodiment or in some embodiments, the method or the hardware system may comprise a ranking process module, 702, which ranks the correction candidates based on one or more criteria. In some embodiments, the one or more criteria may comprise, for example, the effectiveness or efficiency of a correction candidate to resolve certain hotspots or to improve certain metrics. The one or more criteria may also comprise, for example, the ease of implementation of a particular correction candidate.

The method or the system may further comprise the statistical analysis module, 704, which may be used to determine, for example, whether sufficient amount of data have been made available for the method or the system to perform various actions as described here in a reasonably accurate fashion in the single embodiment or in some embodiments. For example, the statistical analysis process or module may comprise a stochastic process or module to determine whether sufficient amount of data has been made available such that the models invoked in the method or the system will produce reasonably accurate results while their sizes together with the size of the data required remain compact, minimized, or optimized. One of the advantages of using the statistical analysis process or module to ensure that the various models invoked in the method or the hardware system produce accurate results while keeping the sizes of the models compact, minimized, or optimized is that a typical data explosion problem may thus be avoided, and that the method or the hardware system may achieve a balance between efficiency and accuracy.

The method or the hardware system may also comprise the adaptive learning module, 706, which may comprise an expert system module, a knowledge system module, a problem solving module with embedded decision logic, or an artificial intelligence module. In this single embodiment or in some embodiments, the related expertise, expert knowledge, or experience utilized by the adaptive learning module for implementing hotspot detection, repair, and optimization of an electronic circuit design or improvement of metrics may be codified in the database associated with the hotspots or metrics or in one or more programs or decision logic for a problem solving process or system module. The one or more programs or decision logic in the problem solving module may be further modified when it is determined the method or the system does not produce desirable or desired results by applying one of the correction candidates.

For example, additional information such as certain context information surrounding a hotspot may be added to the expert system module or the knowledge system module upon the failure of the method or the hardware system to fix the hotspot at a particular location by applying a particular correction candidate in the single embodiment or in some embodiments. The context information may comprise, in some embodiments for example, the location and/or type of the hotspot or metric, the performance requirements of the circuit components in the hotspot area, the information about the neighboring components adjacent to the circuit components in the hotspot area, or some suspect electronic circuit components which may exhibit some long-range effect. In the single embodiment or in some embodiments, the one or more programs or decision logic, or both may be modified when the method or the system does not generate or produce desirable or desired results.

In the single embodiment or in some embodiments, the method or the hardware system for implementing hotspot detection, repair, and optimization of an electronic circuit during various stages of the design of an electronic circuit design may comprise an artificial intelligence module to aid the generation of hints in response to the predicted hotspots or metrics. The method or the hardware system may also invoke the statistical analysis module or process to ensure that a sufficient amount of data has been made available for the artificial intelligence process or module in the single embodiment or in some embodiments. In this single embodiment or in some embodiments, the method or the hardware system identifies one or more artificial intelligence settings.

In some embodiments, the method or system adopts a neural network for the purpose of artificial intelligence. In some embodiments, the neural network refers to the artificial neural network or a simulated neural network which is composed of structurally or functionally interconnecting artificial nodes or programming constructs using a mathematical and/or a computational model for information processing by mimicking one or more properties of biological neurons based upon a connectionistic approach to computation without actually constructing the actual model of the system under investigation. Note that various terms such as neurons, neurodes, processing elements, or units may be used interchangeably with the term "structurally or functionally interconnecting artificial nodes" or "programming constructs". In various embodiments, the artificial neural network comprises an adaptive system which changes its structure based upon external and/or internal information that goes through the artificial neural network.

In the single embodiment or in some embodiments, the method or the hardware system performs artificial intelligence training on the artificial intelligence system or the artificial neural network to find, fine tune, adjust, or modify one or more relationships or correlations between, for example, the available data and the initial hotspot/metric prediction process or module or between the predicted hotspots/metrics and the correction candidate(s) or commands. Once the training of the artificial intelligence process or module is complete, the method or the system may then utilize the artificial intelligence module for the initial prediction of hotspots/metrics or for the identification or determination of one or more correction candidates for a particular hotspot or metric of the electronic circuit design. In the single embodiment or in some embodiments, at least some of the various processes or modules in 322 may also be applied or invoked by the method or the hardware system at 308 in a substantially similar manner as described in the preceding paragraphs.

Referring back to FIG. 3. At 324, the method or system for implementing hotspot detection, repair, and optimization of an electronic circuit design during various stages of the design of an electronic circuit design may apply at least one of the correction candidates to the electronic circuit design in a single embodiment or in some embodiments. The method or the system may apply the at least one correction candidates by identifying or determining a sequence of commands for the at least one of the correction candidates.

At 326, the method or the hardware system for implementing hotspot detection, repair, and optimization of an electronic circuit design during various stages of the design of an electronic circuit design may determine whether or not the outcome of applying the at least one of the correction candidates is desirable or acceptable in the single embodiment or in some embodiments. In some embodiments where the method or the hardware system determines that the outcome is desirable or acceptable, the method or the hardware system may continue to proceed to 330 to continue the electronic circuit design process.

In some embodiments where the method or the hardware system determines that the outcome of applying the at least one of the correction candidates is not acceptable or desirable, the method or the hardware system may loop back to 324 to apply additional correction candidate(s) to the electronic circuit design and re-evaluate whether the outcome of such application of additional correction candidate(s) is desirable or acceptable. In addition or in the alternative, the method or the system may also loop back to 302 to re-perform the definition or identification of criteria for hotspots or metrics and then continue with the process as described in FIG. 3 and the preceding paragraphs.

At 328, the method or the hardware system for implementing hotspot detection, repair, and optimization of an electronic circuit design during various stages of the design of an electronic circuit design may initiate certain database operations as described below with reference to FIGS. 6A-B.

Figure 6A:
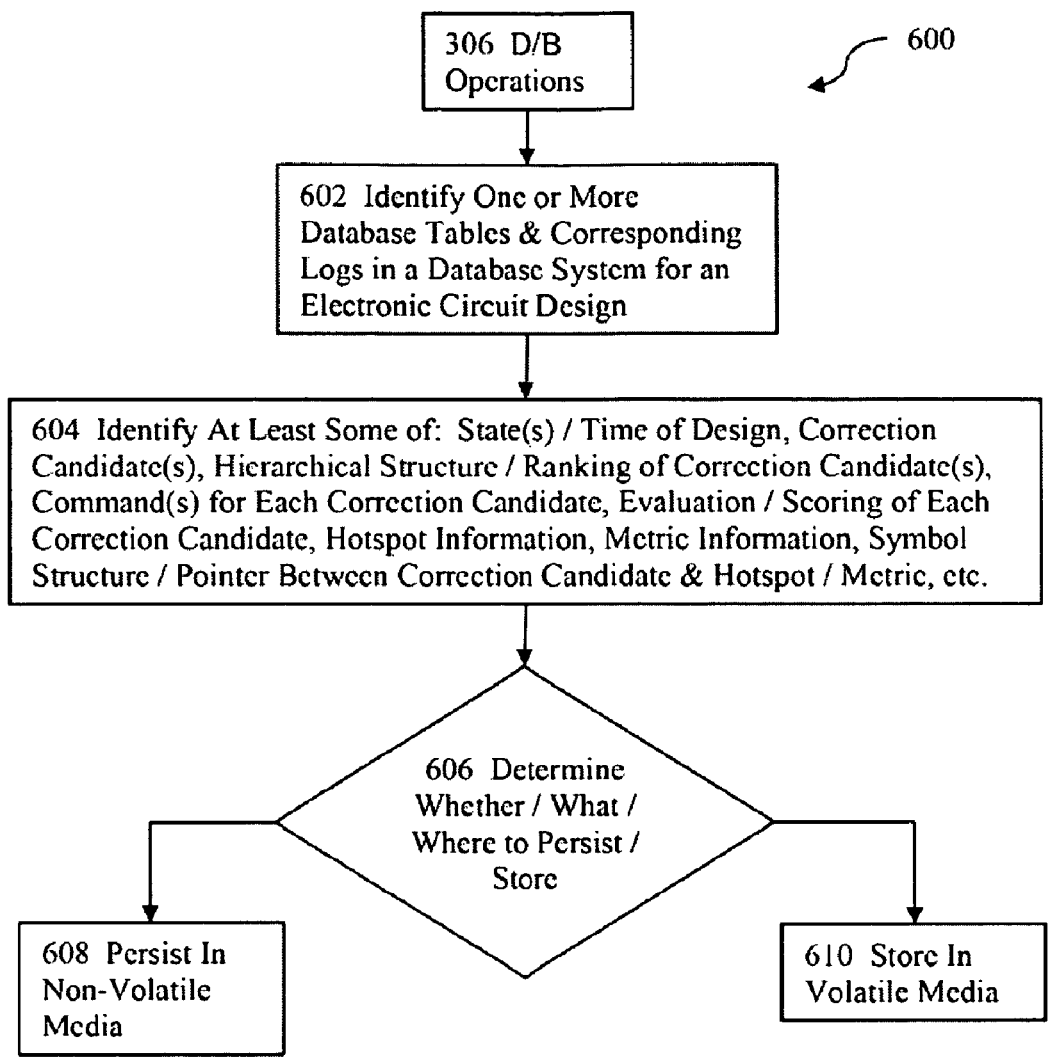
FIG. 6A illustrates details of the Database Operations process or module for the method or the system for implementing hotspot detection, repair, and optimization of an electronic circuit design in the single embodiment or in some embodiments.

Referring to FIG. 6A which details of the Database Operations process or module 600 for the method or the system for implementing hotspot detection, repair, and optimization of an electronic circuit design in the single embodiment or in some embodiments. After the actions or invocation of modules of at least one of 308, 312, 314, 316, 320, and 330, the method or the system may initiate some database operations at 306 in the single embodiment or in some embodiments. The method or the system may identify, at 602, one or more database tables and their corresponding logs, if any, in a database system. The corresponding logs may comprise, for example, one or more of undo logs, redo logs, state logs which record the various states of the electronic circuit design such as the state of the electronic circuit design at a given instance and/or information about individual circuit components. The information about individual circuit components may comprise, for example, geometric information, type, or nature of an individual circuit component.

At 604, the method or system for implementing hotspot detection, repair, and optimization of an electronic circuit design during various stages of the design of an electronic circuit design identifies relevant data or information for certain database operations in the single embodiment or in some embodiments. The relevant data or information may comprise, for example, at least some of the state(s) of an electronic circuit design, the electronic circuit design at a given time, correction candidates for various types of hotspots or metrics predicted or verified, the ranks or order of the correction candidates, the hierarchical structure or the order list of the correction candidates, the corresponding sequence of commands for at least one of the correction candidates, evaluation or scoring of at least one of the correction candidates, hotspot information, metric information, mapping between the hotspots/metrics and the correction candidates or the corresponding sequences of commands, links/pointer or the symbol structure between the hotspots/metrics and the correction candidates or the corresponding sequences of commands, etc. The hotspot information may comprise, for example, the locations, sizes, nature, or types of hotspots.

At 606, the method or system for implementing hotspot detection, repair, and optimization of an electronic circuit design during various stages of the design of an electronic circuit design may then determine whether or not to store or persist some of the information or data identified at 602, where to store or persist some of the information or data identified at 602, and what information or data to store or persist in the single embodiment or in some embodiments. Once the method or system for implementing hotspot detection, repair, and optimization of an electronic circuit design during various stages of the design of an electronic circuit design determines at 606 whether, what, and where to persist in the database, the method or the hardware system may then persist some of the information or data in a non-volatile medium (media) at 608. In some cases where the method or the hardware system determines, at 606, to store some of the information or data (such as the application outcome of certain custom correction candidates or of custom commands) in some temporary storage device, the method or the system may then store such information or data in a volatile medium (media) at 610.

Figure 6B:
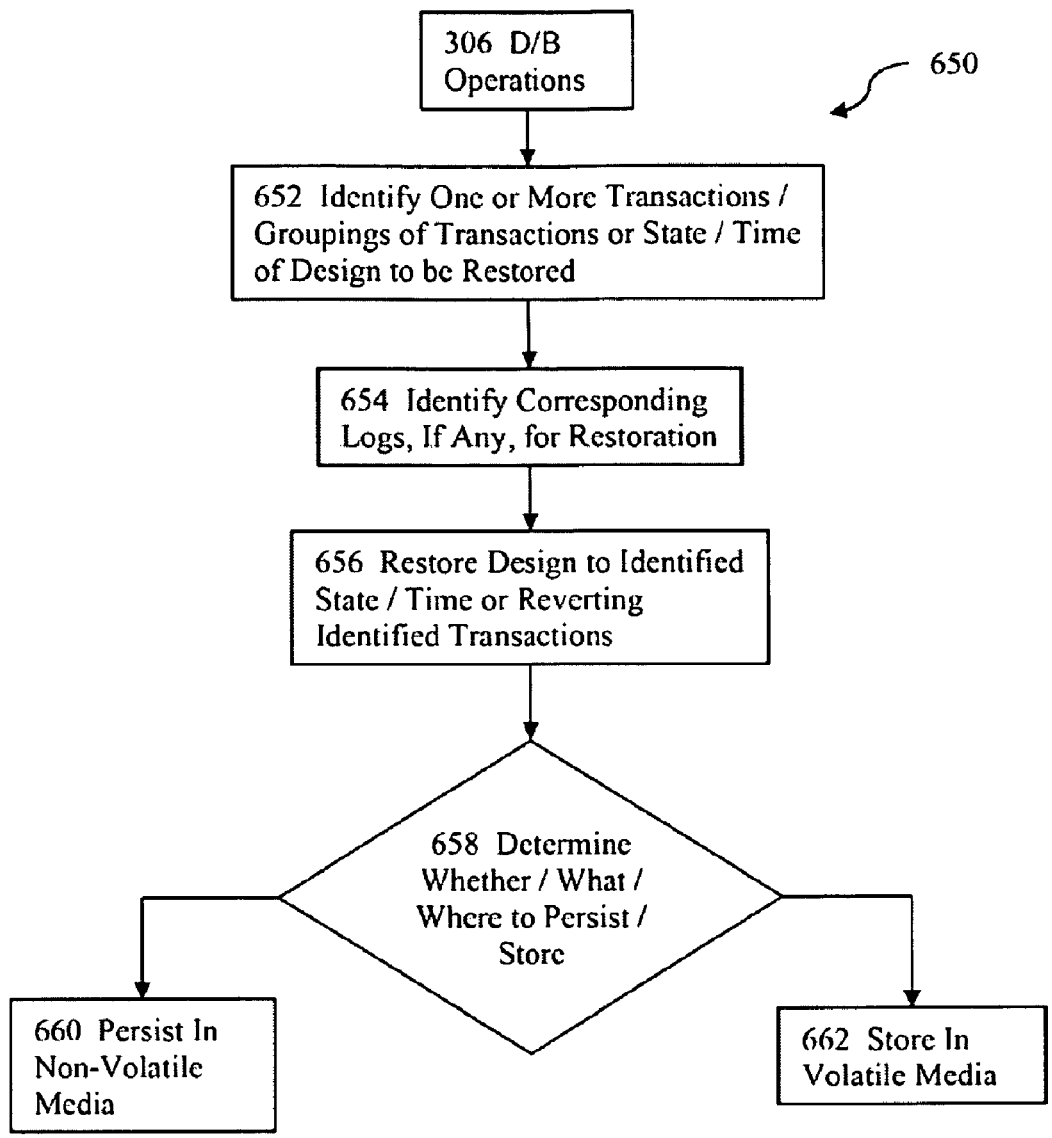
FIG. 6B illustrates further details of the Database Operations process or module for the method or the system for implementing hotspot detection, repair, and optimization of an electronic circuit design in the single embodiment or in some embodiments.

Referring to FIG. 6B which illustrates further details of the Database Operations process or module 650 for the method or the hardware system for implementing hotspot detection, repair, and optimization of an electronic circuit design in the single embodiment or in some embodiments. After the actions or invocation of modules of at least one of 308, 312, 314, 316, 320, and 330, the method or the system may initiate some database operations at 306 in the single embodiment or in some embodiments.

The method or the hardware system for implementing hotspot detection, repair, and optimization of an electronic circuit design may then identify one or more transactions or one or more groups of transactions each of which comprises at least two transactions for the correction candidates to be applied to the electronic circuit design. A transaction may comprise a unit of work performed within the database management system or a similar system against a database, and treated in a coherent and reliable way independent of other transactions. In some embodiments, the method or the system utilizes one or more transactions to provide isolation between programs or entities concurrently accessing the database of the electronic circuit design. In some embodiments, each of the transactions is atomic. That is, each of the transactions comprises a series of operations which must either all occur, or nothing occurs. The transactions are also durable. That is, the transactions that have been committed will survive permanently even if the database system crashes.

In the single embodiment or in some embodiments, the method or the hardware system for implementing hotspot detection, repair, and optimization of an electronic circuit during various stages of the design of an electronic circuit design proactively groups a plurality of transactions into an atomic transaction group where if one database operation in any of the transaction in the atomic transaction group executes, all the other database operations in the entire atomic transaction group execute, or nothing executes at all. The proactive grouping of transactions into an atomic transaction group may be performed based at least in part upon input by the user or may be determined by the method or the hardware system. For example, the method or the hardware system may identify and correlate certain commands or even correction candidates based upon prior knowledge, experience, etc. such that when one of the commands executes, all the other commands thus correlated in the atomic transaction group also execute, or nothing in the atomic transaction group executes at all.

In the single embodiment or in some embodiments, the method or the hardware system for implementing hotspot detection, repair, and optimization of an electronic circuit design may identify, at 652, one or more states of the electronic circuit design or the time and the corresponding state of the electronic circuit design. In some embodiments, the method or the hardware system for implementing hotspot detection, repair, and optimization of an electronic circuit design may also identify the current state or time of the electronic circuit design.

The method or the hardware system for implementing hotspot detection, repair, and optimization of an electronic circuit design may then identify, at 654, corresponding logs, if any, for restoration operations in the single embodiment or in some embodiments. The corresponding logs may comprise one or more transaction logs which may comprise, for example, one or more undo logs, redo logs, state logs, or any combination thereof. The redo logs comprise information which may be used to modify a portion of the database of the electronic circuit design from one state to its next changed state. Therefore, if a failure occurs during the process as described above, the redo logs may be applied to the database of the electronic circuit design to restore any changes made to the in-memory copy of the database. The undo logs may comprise information which may be used to roll back or reverse a portion of the database of the electronic circuit design from a later state to its next earlier state. The state log or a set of state blocks may comprise the information or data that may be used to set the states of various portions of the electronic circuit design to mimic successful completion of the forward- or backward-restoration operations on the database of the electronic circuit design.

At 656, the method or the hardware system for implementing hotspot detection, repair, and optimization of an electronic circuit design may restore the design to an identified state of the electronic circuit design or to a specific time at which the database existed. For example, the method or the hardware system may identify and store sufficient information for the electronic circuit design at a first time on a first date, and then restore the electronic circuit design at the second time on the second date to the electronic circuit design at the first time on the first date by using various transaction logs as described above.

At 658, the method or the hardware system for implementing hotspot detection, repair, and optimization of an electronic circuit design may then determine whether to persist or store certain information of the database, what information or data to store or persist, and where to store or persist such certain information of the database of the electronic circuit design in the single embodiment or in some embodiments. Then the method or the hardware system may then proceed to 660 to persist some information or data in a non-volatile medium (media) or to 662 to store some information or data in a volatile medium (media) depending upon the decision at 658.

Figure 4:
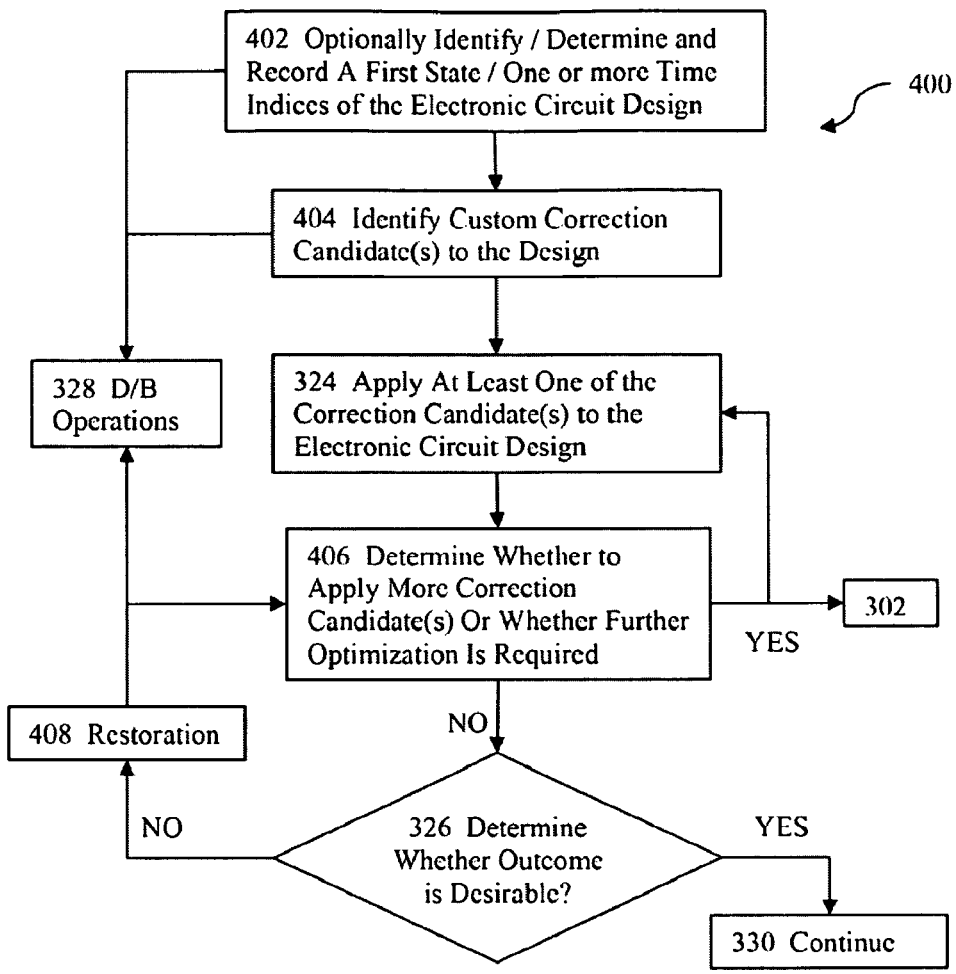
FIG. 4 illustrates more details of some optional process(es) or module(s) of the method or the system for implementing hotspot detection, repair, and optimization of an electronic circuit design as depicted in FIG. 3 in the single embodiment or in some embodiments.

Referring to FIG. 4 which illustrates more details of some optional process(es) or module(s) of the method or the system 400 for implementing hotspot detection, repair, and optimization of an electronic circuit design as depicted in FIG. 3 in the single embodiment or in some embodiments. In the single embodiment as described in FIG. 3 or in some embodiments, the method or the hardware system for implementing hotspot detection, repair, and optimization of an electronic circuit design may optionally identify, determine, or record a first state or one or more time indices or timestamps of the electronic circuit design at 402.

The method or the system may also optionally identify or receive one or more custom correction candidates for one or more hotspots or metrics in the electronic circuit design in some embodiments at 404. The method or the hardware system may then proceed to 324 as illustrated in FIG. 3 to apply at least one of the correction candidates to the electronic circuit design.

The method or the hardware system may then determine whether to apply more correction candidate(s) or whether further optimization is required or desired at 406. In the single embodiment or in some embodiments where the method or the system determines at 406 that the application of more correction candidate(s) or further optimization is required or desired, the method or the hardware system may then loop back to either 302 (not shown in FIG. 4) to identify or determine one or more additional criteria for the hotspots or metrics. In addition or in the alternative, the method or the hardware system may loop back to 324 to apply another correction candidate to the electronic circuit design in the single embodiment or in some embodiments.

The method or the hardware system may determine whether the outcome of applying the correction candidate(s) is desirable or acceptable at 326. In the single embodiment or in some embodiments where the method or the hardware system determines that the outcome is desirable or acceptable at 326, the method may proceed to 330 to continue the electronic circuit design process. In the single embodiment or in some other embodiments where the method or the hardware system determines at 326 that the outcome is not desirable or acceptable, the method or the system may proceed to 408 to initiate the restoration process. More details about the restoring process or module at 408 will be described in subsequent paragraphs with reference to FIG. 5. In these embodiments, the method or the hardware system may proceed to 406 or to 324 or may proceed to 302 until the outcome is acceptable or desirable.

In some embodiments where the method or the hardware system determines the outcome to be unacceptable or undesirable, the method or the system may yet determine to proceed to 330 to continue with the electronic circuit design process without looping back to 302, 324, or 406. Upon the completion of actions or execution of processes or modules 402, 404, and 408, the method or the hardware system may proceed to 328 to initiate certain database operations as described in FIG. 3 above.

Figure 5:
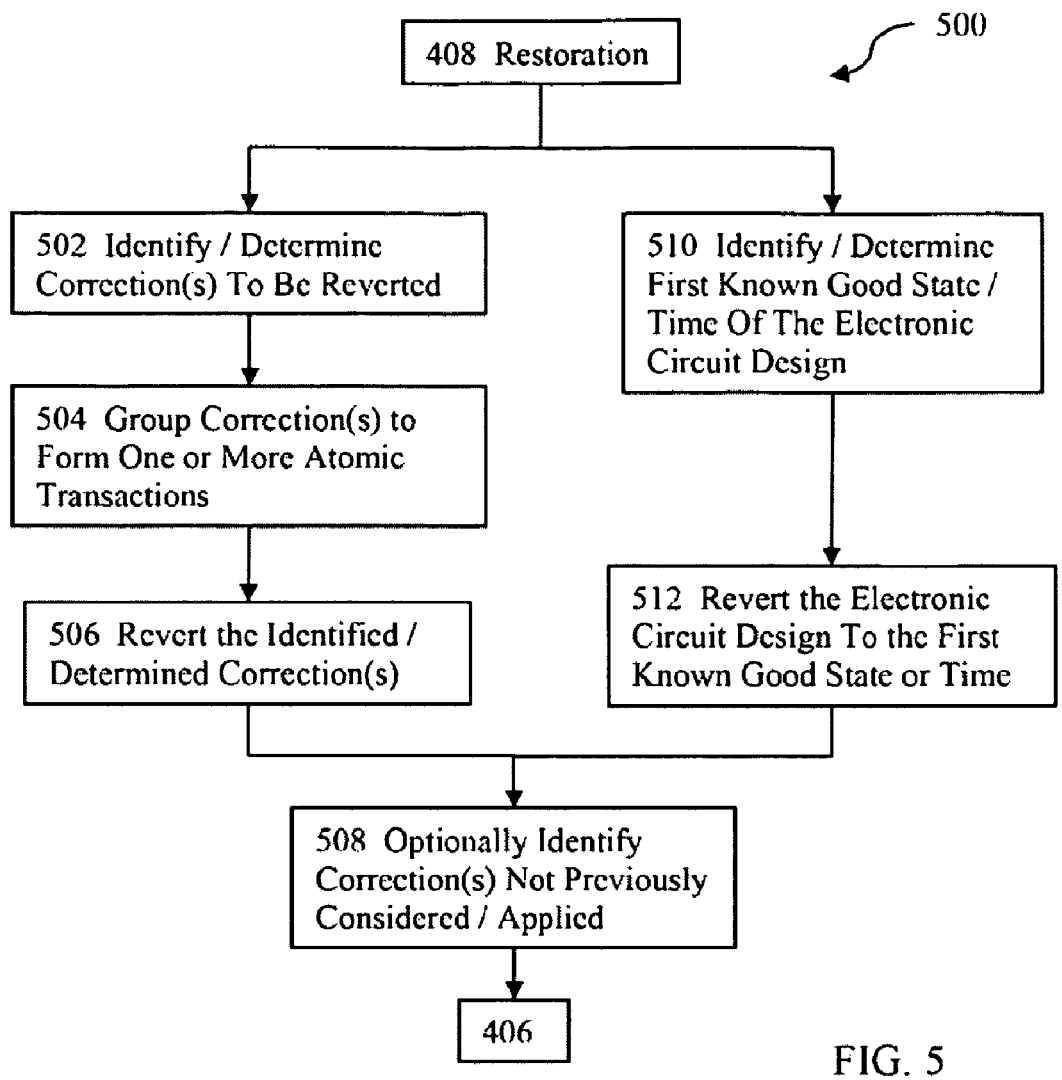
FIG. 5 illustrates more details of the restoration process or the restoration module as illustrated in FIG. 4 in the single embodiment or in some embodiments.

Referring to FIG. 5 which illustrates more details of the restoration process or the restoration module 500 as illustrated in FIG. 4 in the single embodiment or in some embodiments. At 408, the method or the system for implementing hotspot detection, repair, and optimization of an electronic circuit design respectively initiates the restoration process or invokes the restoration module in the single embodiment as illustrated in FIG. 4 or in some embodiments.

The method or the hardware system may identify or determine one or more correction candidates or their corresponding sequences of commands to be reverted at 502. In the single embodiment or in some embodiments where the one or more correction candidates or their corresponding sequences of commands have been formulated as one or more database transactions, the method or the hardware system may then identify or determine the one or more database transactions to be reverted at 502. In the single embodiment or in some embodiments where the method or the hardware system proactively groups a plurality of correction candidates, sequences of commands, or transactions into an atomic transaction group, the method or the hardware system may thus identify or determine the atomic transaction group to be reverted at 502.

The method or the hardware system may then revert the identified or determined correction candidates, sequences of commands, transactions, or the atomic transaction group at 506 to forward or backward restore the electronic circuit design in the single embodiment or in some embodiments. The method or the hardware system may revert the electronic circuit design by using, for example, various transaction logs as described in the preceding paragraphs. At 508, the method or the system may optionally identify one or more correction candidates not previously considered by the method or the hardware system or not previously applied to the electronic circuit design at 508 and then proceeds to 406 as previously described.

In addition or in the alternative, the method or the system for implementing hotspot detection, repair, and optimization of an electronic circuit design may proceed from 408 to 510 to identify or determine a first state or time of the electronic circuit design in the single embodiment or in some embodiments. In some embodiments, the first state constitutes the first known good state of the electronic circuit design. The method or the hardware system may then revert the electronic circuit design to the first state or time at 512. The method or the hardware system may then proceed to 508 to optionally identify one or more correction candidates which have not been considered by the method or the hardware system or have not been applied to the electronic circuit design. After 508, the method or the hardware system may proceed to 406 as previously described in the preceding paragraphs.

In the single embodiment or in some embodiments, the method or the hardware system may simultaneously use one or more processors, one or more processor cores, or any combination thereof (collectively "processor") to simultaneously perform various tasks or processes in parallel as described above. For example, the method or the hardware system may divide up the evaluation of a plurality of correction candidates into a plurality of tasks and invokes a plurality of processors, processor cores, or combination thereof on a single or a plurality of computing systems to execute the plurality of tasks.

In the single embodiments or in some embodiments where various tasks are performed in parallel, the method or the hardware system may spawn one or more slave nodes and load at least one of the one or more slave nodes with a reduced version of the electronic circuit design. In these embodiments, the reduced version of electronic circuit design may be constructed to contain just enough information or data of a smaller portion of the full electronic circuit design for the corresponding slave node to complete the processing of the assigned task. One of the advantages of this approach is that the slave nodes loaded with such reduced version of the electronic circuit design thus requires less resources to complete the assigned task. In some other embodiments or in some embodiments where various tasks are performed in parallel, the method or the hardware system may spawn one or more slave nodes and load each of the one or more slave nodes with the full electronic circuit design.

In the single embodiment or in some embodiments, the method or the hardware system may also divide a job into a plurality of tasks and run the plurality of tasks on multiple processors or multiple processor cores communicating over a network. In some embodiments, such network exhibits heterogeneous environments, latencies in network links, or even unpredictable failures in the network. In other words, the method or the hardware system may perform various processes or tasks in a distributed computing environment.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

System Architecture Overview

Figure 8:
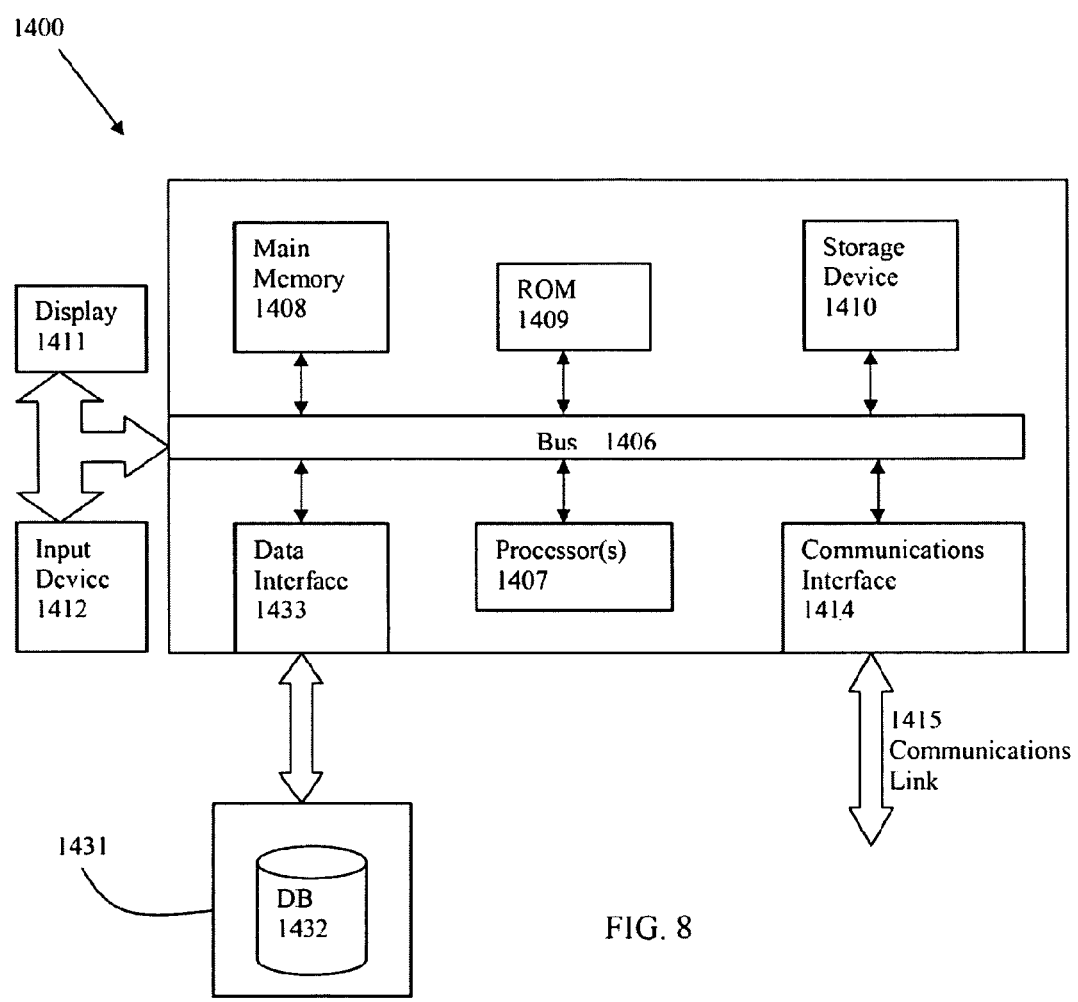
FIG. 8 illustrates a block diagram of an illustrative computing system suitable for implementing various embodiments of the invention as set forth in the application.

FIG. 8 illustrates a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control (not shown).

According to one embodiment of the invention, computer system 1400 performs specific operations by one or more processor or processor cores 1407 executing one or more sequences of one or more instructions contained in system memory 1408. Such instructions may be read into system memory 1408 from another computer readable/usable storage medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions as described in the preceding paragraphs may be performed by using one or more processors, one or more processor cores, or combination thereof 1407. For example, the act of defining, identifying, or determining one or more criteria for hotspots or metrics, the act of determining when or whether further optimization is necessary or desired, the act of determining the hints, the act of determining which correction candidate(s) to apply, the act of determining whether the temporary modifications or fixes are desirable, the act of determining whether there remain some hotspots or whether the metrics are acceptable or desired, the act of determining whether further optimization or repair is required or desired, etc. may be performed by one or more processors, one or more processor cores, or combination thereof.

The term "computer readable storage medium" or "computer usable storage medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable storage media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. In an embodiment, the computer system 1400 operates in conjunction with a data storage system 1431, e.g., a data storage system 1431 that contains a database 1432 that is readily accessible by the computer system 1400. The computer system 1400 communicates with the data storage system 1431 through a data interface 1433. A data interface 1433, which is coupled to the bus 1406, transmits and receives electrical, electromagnetic or optical signals that include data streams representing various types of signal information, e.g., instructions, messages and data. In embodiments of the invention, the functions of the data interface 1433 may be performed by the communication interface 1414.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer-implemented method for implementing hotspot detection, repair, and optimization of an electronic circuit design, the method comprising:
defining or identifying a criterion for a hotspot or a metric related to the hotspot of the electronic circuit design;
performing initial prediction of the hotspot or the metric by using a first model;
applying a correction candidate for the hotspot to the electronic circuit design based at least in part upon the initial prediction that is performed by using the first model; and
determining, by using a second model, whether the hotspot is resolved or improved in view of the criterion or whether the metric related to the hotspot is improved by a result of application of the correction candidate to the electronic design that is based at least in part upon the initial prediction, wherein
the act of determining whether the hotspot is resolved or improved or whether the metric is improved is performed by one or more processors, one or more processor cores, or a combination thereof.

2. The computer implemented method of claim 1, wherein the act of defining or identifying a criterion for a hotspot or a metric further comprising defining or identifying an objective function by using at least the criterion.

3. The computer implemented method of claim 1, wherein the first model comprises one or more efficient models of one or more manufacturing processes.

4. The computer implemented method of claim 3, wherein act of performing the initial hotspot or metric prediction using the first model comprising the efficient model is performed without performing a physics based simulation.

5. The computer implemented method of claim 1, wherein the first model comprises one or more physics based models of one or more manufacturing processes.

6. The computer implemented method of claim 1, wherein act of performing the initial hotspot or metric prediction is performed further by using a second model.

7. The computer implemented method of claim 6, wherein the first model and the second model comprise a combination of an efficient model and a physics based model.

8. The computer implemented method of claim 1, wherein the criterion for a hotspot or a metric comprises a user defined criterion which is identified in a form of a script language without performing software code compilation.

9. The computer implemented method of claim 1, further comprising:
generating one or more hints for the hotspot detection and correction or for optimization of the electronic circuit design.

10. The computer implemented method of claim 9, further comprising:
ordering the one or more hints based on one or more factors.

11. The computer implemented method of claim 1, wherein the act of applying the correction candidate further comprising:
maintaining a plurality of constraints or design rules to cause a DRC clean result without violating the plurality of constraints or the design rules.

12. The computer implemented method of claim 1, further comprising:
generating one or more commands for the correction commands, wherein the one or more commands are to be used in the act of applying a correction candidate to the electronic circuit design.

13. The computer implemented method of claim 1, further comprising:
generating or updating a mapping between the one or more hotspots or the one or more metrics and the correction candidates.

14. The computer implemented method of claim 12, further comprising:
generating or updating a mapping between the one or more hotspots or the one or more metrics and the one or more commands.

15. The computer implemented method of claim 1, wherein the second model comprises a sign-off model.

16. The computer implemented method of claim 1, further comprises:
generating or updating a database to persist information or data for the hotspot, the metric, the correction candidate.

17. The computer implemented method of claim 1, wherein the correction candidate is user defined.

18. The computer implemented method of claim 17, where in correction candidate is identified in a form of a script language without performing software code compilation.

19. The computer implemented method of claim 12, wherein at least one of the one or more commands is a user defined command.

20. The computer implemented method of claim 19, wherein the user defined command is identified in a form of a script language without performing software code compilation.

21. The computer implemented method of claim 1, further comprising:
identifying a first state of the electronic circuit prior to the act of applying the correction candidate; and
restoring the electronic circuit design to the first state after the act of applying the correction candidate by reverting the act of applying the correction candidate to the electronic circuit.

22. The computer implemented method of claim 21, further comprising:
identifying a database transaction for the act of applying the correction candidate to the electronic circuit design.

23. The computer implemented method of claim 21, further comprising:
identifying an atomic database transaction group comprising one or more database transactions for the act of applying the correction candidate to the electronic circuit design.

24. The computer implemented method of claim 1, further comprising:
performing one or more database operations.

25. The computer implemented method of claim 24, further comprising:
identifying one or more database tables and one or more corresponding database logs;
identifying a first information; and
determining whether, what, or where to persist or store the first information.

26. The computer implemented method of claim 9, wherein the act of generating one or more hints is performed by invoking at least one of a ranking process for the one or more hints, or an adaptive learning process.

27. A system for implementing hotspot detection, repair, and optimization of an electronic circuit design, the system comprising:

one or more processors, one or more processor cores, or a combination thereof that is to:

define or identify a criterion for a hotspot or a metric related to the hotspot of the electronic circuit design;

perform initial prediction of the hotspot or the metric by using a first model;

apply a correction candidate for the hotspot to the electronic circuit design based at least in part upon the initial prediction that is performed by using the first model; and determining, by using a second model, whether the hotspot is resolved or improved in view of the criterion or whether the metric is related to the hotspot is improved by a result of application of the correction candidate to the electronic design that is based at lest in part upon the initial prediction.

28. A computer program product comprising a non-transitory computer-usable storage medium having a sequence of instructions which, when executed by one or more processors, processor cores, or combination thereof, cause the one or more processors, processor cores, or combination thereof to execute a process for implementing hotspot detection, repair, and or optimization of an electronic circuit design, the process comprising:

defining or identifying a criterion for a hotspot or a metric of the electronic circuit design;

performing initial hotspot or metric prediction by using a first model;

applying, a correction candidate for the hotspot to the electronic circuit design that is performed by using the first model; and determining, by using a second model, whether the hotspot is resolved or in improved in view of the criterion or whether the metric related to the hotspot is improved by a result of application of the correction candidate to the electronic design that is based at least in part upon the initial prediction, wherein the act of determining whether the hotspot is resolved or improved or whether the metric is improved is performed by one or more processors, or more processor cores, or a combination thereof.

29. The system of claim 27, wherein the criterion for a hotspot or a metric comprises a user defined criterion which is identified in a form of a script language without performing software code compilation.

30. The system of claim 27, wherein the one or more processors, processor cores, or combination thereof that are further to:

generating one or more hints for detection and correction of the hotspot or for optimization of the electronic circuit design in view of the hotspot; and ordering the one or more hints based on one or more factors.

31. The system of claim 27, wherein the one or more processors, processor cores, or combination thereof that are further to:

maintain a plurality of constraints or design rules to cause a DRC clean result without violating the plurality of constraints or the design rules.

32. The computer program product of claim 28, wherein the criterion for a hotspot or a metric comprises a user defined criterion which is identified in a form of a script language without performing software code compilation.

33. The computer program product of claim 28, wherein the process further comprises:

generating one or more hints for detection and correction of the hotspot or for optimization of the electronic circuit design in view of the hotspot; and ordering the one or more hints based on one or more factors.

34. The computer program product of claim 28, wherein the process further comprises:

maintain a plurality of constraints or design rules to cause a DRC clean result without violating the plurality of constraints or the design rules.

* * * * *